United States Patent [19]

Matson

[11] Patent Number: 5,564,672
[45] Date of Patent: Oct. 15, 1996

[54] CONDUIT BINDING SYSTEM FOR USE IN RESTRICTED SPACES

[76] Inventor: Bradley A. Matson, 1959 Phillips, Berkley, Mich. 48072

[21] Appl. No.: 254,569

[22] Filed: Jun. 6, 1994

[51] Int. Cl.⁶ .................................................. F16L 3/08
[52] U.S. Cl. .................... 248/74.3; 24/16 PB; 24/17 AP; 248/68.1
[58] Field of Search .............................. 248/74.3, 74.2, 248/73, 71, 68.1, 65; 24/16 PB, 30.5 T, 16 AP

[56] References Cited

U.S. PATENT DOCUMENTS

| | | | |
|---|---|---|---|
| 3,515,363 | 6/1970 | Fisher | 248/71 |
| 4,669,688 | 6/1987 | Itoh et al. | 24/16 PB X |
| 4,817,901 | 4/1989 | Kuo | 248/231 |
| 4,840,345 | 6/1989 | Neil et al. | 248/71 X |
| 5,020,749 | 6/1991 | Kraus | 248/74.3 |
| 5,112,013 | 5/1992 | Tolbert et al. | 248/74.3 |
| 5,119,528 | 6/1992 | Ono et al. | 24/16 PB |
| 5,188,319 | 2/1993 | Hawash et al. | 248/68.1 |
| 5,224,244 | 7/1993 | Ikeda et al. | 24/16 PB |
| 5,251,861 | 10/1993 | Hayashi | 248/316.5 |
| 5,362,018 | 11/1994 | Darr et al. | 24/16 PB X |

*Primary Examiner*—Ramon O. Ramirez
*Attorney, Agent, or Firm*—Harness, Dickey & Pierce, P.L.C.

[57] ABSTRACT

A conduit binding system for use in restricted spaces of motor vehicles comprises an extruded body and a fastener for fastening the extruded body to a support panel. The extruded body can be of any usable selected length and is composed of a flexible material such as a plastic. The preferred plastic is polypropylene. The extruded body has a plurality of axial perforations that allow a length of the extrusion to be wrapped about one or more wires or tubes and to have its outer shape adapted to fit within a restricted space. The fastener attaches the body to a support member. The fastener may be of either wrap-around construction or may be a fastener fitted between the body and the support member. The fasteners are also preferably composed of a plastic such as polyethylene.

15 Claims, 3 Drawing Sheets

CONDUIT BINDING SYSTEM FOR USE IN RESTRICTED SPACES

BACKGROUND OF THE INVENTION

I. Field of the Invention

The present invention relates to a conduit binding system for use in restricted spaces. More particularly, the present invention relates to a conduit binding system for use in restricted spaces in motor vehicles comprising an extruded body and a fastener for fastening the extruded body to a support panel. The extruded body has a plurality of axial perforations that allow a length of the extrusion to be wrapped about one or more wires or hoses and to have its outer shape adapted to fit within a restricted space.

II. Description of the Relevant Art

Early automobiles had very simple wiring patterns For example, the one-time ubiquitous Model "T" Ford began its production life with four spark plug wires, a "magneto" wire, and a simple 5-wire harness connecting the fire wall-mounted coil box with a distributor-like commutator. Attaching the 5-wire harness to the frame was easily accomplished with simple clamps.

As motor vehicles became more sophisticated, so did their wiring systems. By the time the Model "A" Ford came along in the late 1920's, the electric horn and head, cowl, dome and tail lights required lead and switch wires, and multiple wires were wrapped in cloth looms to package the wire bundles. Again, however, simple clamps allowed for attachment of the looms to the vehicle frame or other support member.

In the situation of both of these early cars, the simplicity of attachment was made possible because there were few constraints on space—the engine compartments and chassis of these vehicles allowed a generous area for disposition of the wiring systems. Routing and positioning of these cables was relatively easy.

This is not true for today's vehicles. The number, size and variety of wires and hoses required to make present high performance, low-pollution cars run, coupled with the near-exponential growth in accessories and operational "black boxes" and modules, has elevated routing and securing of harnesses to a high art. No longer can the wiring harness be simply attached to a support structure. A bundle of wires cannot simply be shoved between, for example, an oddly-shaped module and a steering bracket. A round bundle of wires cannot fit in such a narrow space.

Many straps are known that have flexible inner and outer diameters. One such design is embodied in U.S. Pat. No. 5,020,749, issued to Kraus for a band element for holding a variety of objects. This patent teaches an adjustable strap having a fastener end for disposition in a supporting surface and strap portion for holding wires or other objects. An alternate design is embodied in U.S. Pat. No. 5,112,013, issued to Tolbert et al. for a tie strap specifically suited for electric wiring. The invention of this patent discloses a two-pieced unit, with one of the pieces being an adjustable strap and the other being a base into which the strap part is fitted. The base is attached to the supporting surface.

Still another design for the flexible straps of present use is embodied in U.S. Pat. No. 5,119,528, issued to Ono et al. for a tying band. This patent discloses a base portion and a strap portion. The base portion includes a fastener for attachment to a supporting surface. The strap portion may be adjusted to accommodate a variety of wires or similar objects having a variety of sizes Yet another version of the flexible strap, U.S. Pat. No. 5,224,244, issued to Ikeda et al. for a bundling fastener, includes two separate components. The first is a strap having raised areas. The second is a base having apertures through which the strap is slotted. The raised areas Of the strap contact locking arms of the base and adjustment is thereby achieved.

However, while providing some value in holding wires, these designs have failed to provide utility in the situation where a restricted space is encountered. To overcome this, a wire bundle-holding strap has been selectively employed and is specifically designed in an elongated, rounded, or boxed shape, or is otherwise formed in any one of a virtually infinite variety of discrete shapes to fit the conduit into the restricted space.

The problem of this system is that a unique conduit strap must be designed for each restricted space, thus requiring possibly dozens of individually-designed straps for each vehicle model. With the differences between models and model years, the individually-designed, non-adaptable conduit strap system of present vehicle design does not work well.

As may be understood, all previously known designs have failed to provide an effective, cost-efficient and practical method of fitting bundles of wires or tubes within a restricted space on a motor vehicle. Accordingly, there is wanting a conduit binding system that overcomes these problems.

SUMMARY OF THE PRESENT INVENTION

The present invention provides a conduit binding system for use in restricted spaces of a motor vehicle that overcomes the problems and disadvantages of known binding and attachment systems.

The conduit binding system of the present invention for use in restricted spaces of motor vehicles comprises an extruded body and a fastener for fastening the extruded body to a support panel. The body is designed to be axially flexible so that it can be axially folded to define several shapes for placement in restricted spaces.

The extruded body preferably is composed of a solid piece of a plastic. The extruded body can be of any usable selected length. The preferred plastic is polypropylene. To provide for folding along the long axis of the extrusion, the extruded body has a plurality of spaced apart axial perforations that allow a length of the extrusion to be wrapped about one or more wires or tubes and to have its outer shape adapted to fit within a restricted space. Once bent into a desired shape, the body holds the shape.

The body is essentially a sheet of perforated material. The perforations may be on only one side, thereby allowing folding in only one direction on one side, or may be on both sides of the sheet thereby allowing folding along both sides. The preferred width of each strip is between 5.0 and 6.0 mm, while the preferred thickness of each strip is between 1.0 and 2.0 mm. The narrowest point of the perforations is preferably about 0.40 or less to allow for rigidity while also allowing for easy cutting along the perforation. Each uncut sheet is preferably about 140 mm wide. Of course, these numbers can be varied considerably depending on application. If, for example, the desired application is for an alternate non-automotive use, such as in the building construction area for larger wire and piping conduits, the strips would be considerably wider and thicker. In principal, however, the application and construction would be the same.

A fastener would be used for attaching the body to the support member, such as a fire wall, the inner front wheel well surface exposed in the engine compartment, and along the chassis or within the vehicle body. The fastener may be of either wrap-around construction that wraps entirely around the body or may be a fastener fitted between the body and the support member. If the wrap-around type, the fastener is molded to achieve a preferred form. Ideally, the fastener has a locking end that can be opened and shut to allow insertion of the body into the fastener. In either embodiment, a snap-type mounting stud is used for snap-fitting to the support member. The fasteners are also preferably Composed of a plastic. The preferred plastic is polyethylene.

Because of the light weight of the system, it has many applications. The most obvious of these is in the automobile area where a single extruded sheet can replace up to as many as fifty different fasteners. Indeed, because of the inherent lightness and flexibility of the system, a conduit body of the present invention could conceivably extend the entire length of the vehicle.

However, the present invention would also well be suited for such diverse areas as aircraft and marine vehicles. The system of the present invention may also find utility in the industrial and commercial building arenas.

For the accomplishment of these and related objects which shall become apparent as the description proceeds, the present invention resides in the construction, combination and arrangement of parts as shall be hereinafter more fully described and illustrated in the accompanying drawings, and pointed out in the appended claims

BRIEF DESCRIPTION OF THE DRAWINGS

The present invention will be more fully understood by reference to the following detailed description of the preferred embodiments of the present invention when read in connection with the accompanying drawings, in which like reference characters refer to like parts throughout the views, and in which.

DETAILED DESCRIPTION OF THE PREFERRED EMBODIMENTS OF THE PRESENT INVENTION

The drawings disclose the preferred embodiments of the present invention. While the configuration according to the illustrated embodiment is preferred, it is envisioned that alternate configurations of the present invention may be adopted without deviating from the invention as portrayed. The preferred embodiments are discussed hereafter.

Figure 1:
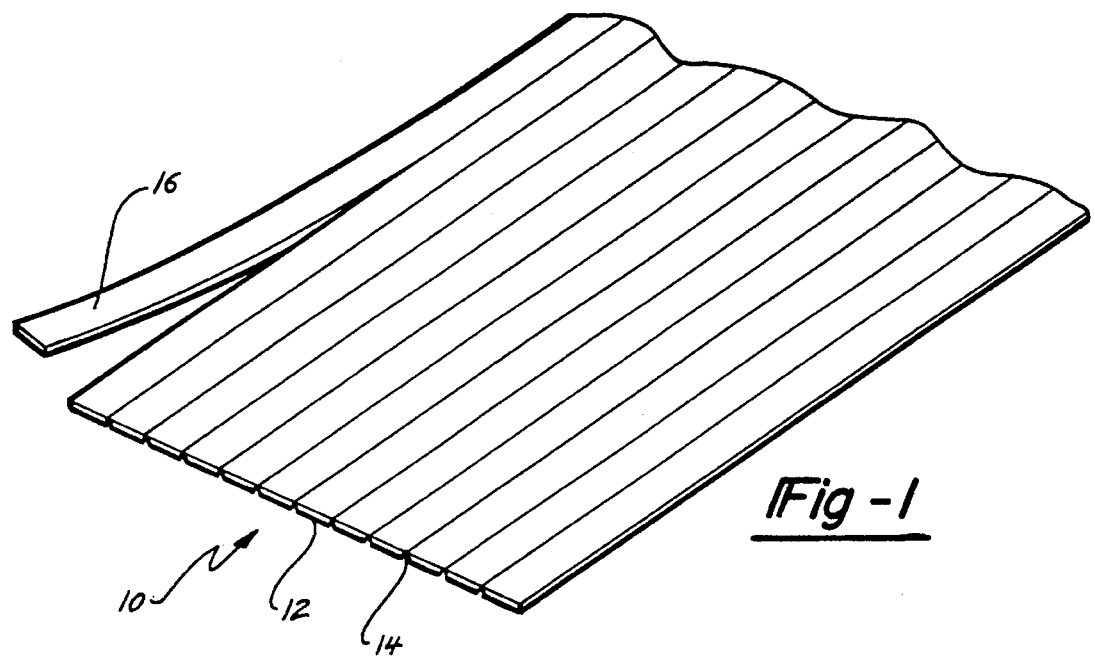
FIG. 1 is a perspective view of a sheet of mostly uncut conduit body material with a strip cut and slightly elevated for illustrative purposes.

Referring to FIG. 1, a perspective view of a sheet of mostly uncut conduit body material is shown generally illustrated as 10. The length and width of the sheet in its uncut form (as illustrated) may be of a variety of sizes, depending on the application of the conduit system. Each sheet is composed of a plurality of individual strips 12, with each strip being separated by a perforation 14 along the long axis of the sheet 10. The strips 12 are illustrated as being solid, but may be of hollow construction. Any one of a variety of plastics may be used, and it is conceivable that a metal or any water-resistant or, waterproof material may be employed. The goal is that the material, once folded along the perforations, retain the shape, provide support to the contained wires or tubes, and be long-wearing. For illustrative purposes, an individual strip 16 is shown cut away from the main along one of the perforations 14.

Figure 2:
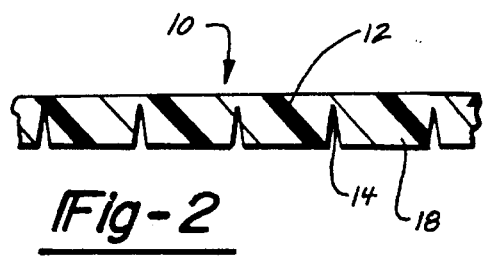
FIG. 2 is a sectional view of the preferred body sheet illustrating one side having perforations.

FIG. 2 is a sectional view of the preferred body sheet 10 with a first side 18 having the axial perforations 14 defined thereon. According to this embodiment, the body may only be folded over along the one side, that being the first side 18. In many applications, such as conduits that have a boxed, rounded, triangular or rectangular shape, the single-sided perforated sheet as illustrated is well-suited.

Figure 3:
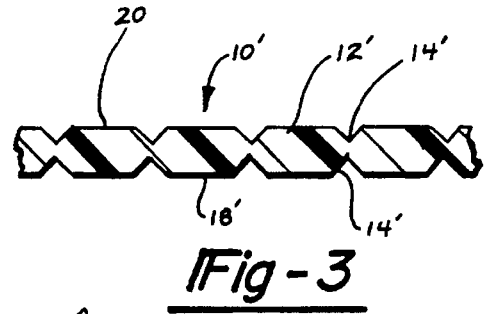
FIG. 3 is a sectional view of an alternate body sheet illustrating two sides having perforations.

FIG. 3 is a sectional view of the alternate body sheet 10' with both a first side 18' and a second side 20 having axial perforations 14'. This construction allows for folding along either side 18', 20 of the sheet 10'. The double-sided perforations as illustrated allow the body to be used for complex constructions.

Figure 4:
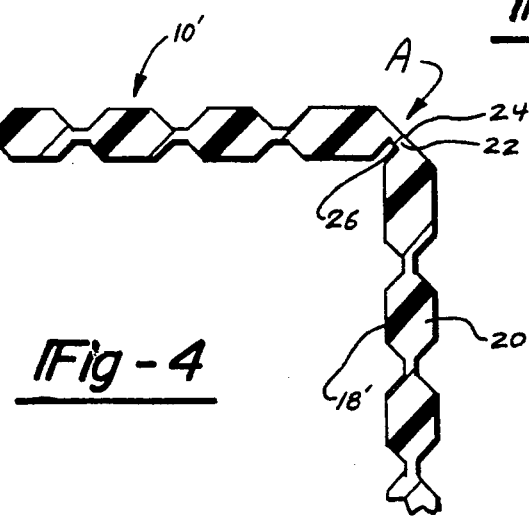
FIG. 4 is a sectional view of the alternate body with two sides of perforations and illustrating the segment as being bent to an approximate 90 degree angle to demonstrate how the sheet may be folded.

FIG. 4 is a sectional view of the alternate body with two sides of perforations of FIG. 3 and illustrating how the sheet 10' reacts to, for example, a 90 degree fold at point A. As illustrated, there is a slight stretch along the outside of a bridge 22 between an outer perforation 24 and an inner perforation 26 at point A. An acute angle can also be created. This design allows for construction of a box-like conduit holder. (The single-sided perforation of FIG. 2 may also be so folded, but only in one direction.)

Figure 5:
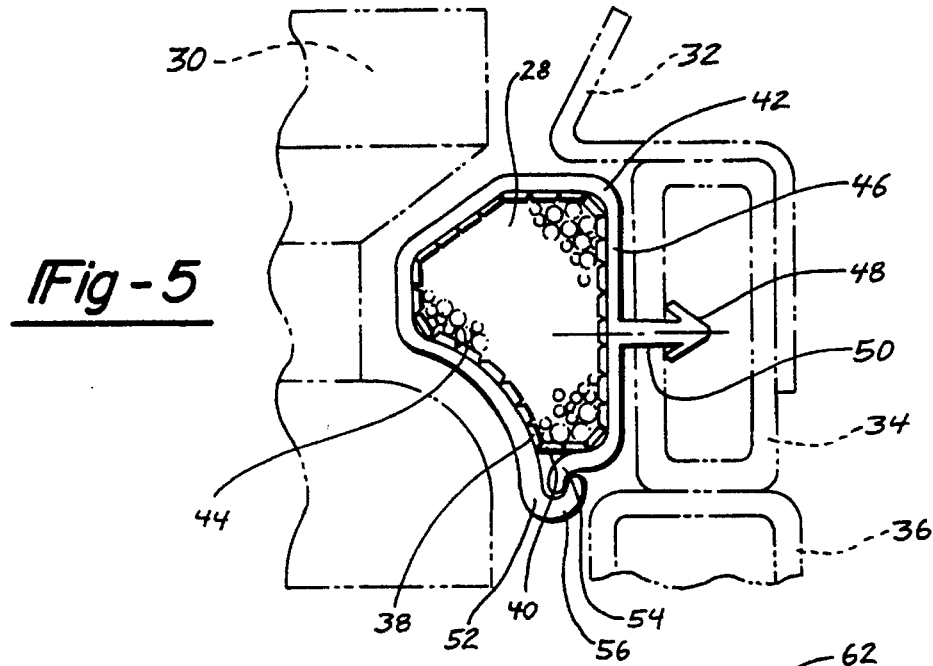
FIG. 5 a sectional view illustrating a conduit bundle disposed between components of a vehicle and the restricted space in which the bundle is disposed.

FIG. 5 is a sectional view illustrating a conduit bundle 28 disposed between a boxed component 30, a first structural member 32, a second structural member 34, and a third structural member 36. The designs of the component 30 and the members 32, 34, 36 are illustrative only, but are shown to demonstrate the versatility of the present invention. The bundle 28 comprises a body 38 consisting of a plurality of individual strips 40 and a fastener 42. Fitted within the body 38 is a plurality of wires or tubes 44.

The body 38 is of the single-sided perforated type of FIG. 2, although the double-sided type of FIG. 3 could as easily have been used. As may be seen, the body 38 is folded to acquire substantially the exact fit of the restricted space between the component 30 and the structural members 32, 34, 36. The body 38 is folded to have flat, angled, and concave surfaces. The variety of the shapes is limited only by the width and thickness of the individual strips 40.

The fastener 42 is of the locking type of the present invention. The fastener 42 includes a strap member 46 and an attachment stud 48. The stud 48 is snap-fitted into an aperture 50 provided in a support member, in this case in the second structural member 34.

The strap member 46 of the fastener 42 includes a lock assembly 52 consisting of a male portion 54 and a female portion 56. For assembly, the body 38 is positioned within the straps of the strap member 46 and the portions 54, 56 are interlocked. The body 38 can thus be snugly held within the strap member 46.

Figure 6:
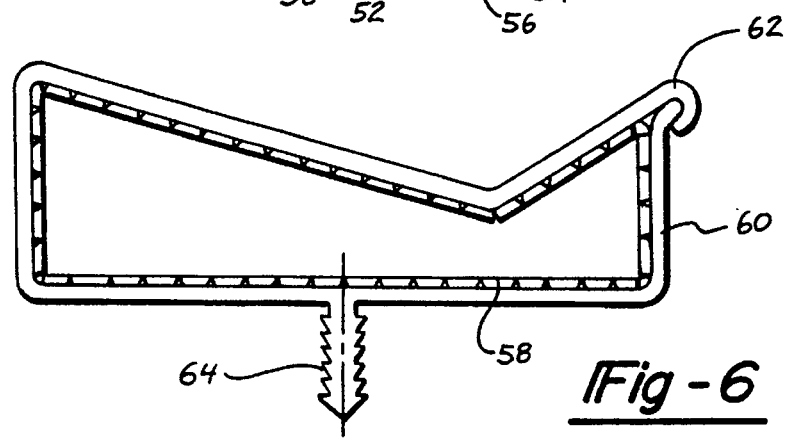
FIG. 6 is a sectional view illustrating a multi-folded body fitted within a fastener body.

FIG. 6 is a sectional view illustrating a multi-folded body 58 fitted within a strap member 60. A lock assembly 62 is provided at one corner of the strap member 60. The flexibility of the present system may be clearly understood by reference to this figure, as both outward and inward folds of the body 58 are seen. A "Christmas Tree" type stud 64 is provided for "one-way" fitting to the support member of the vehicle.

Figure 7:
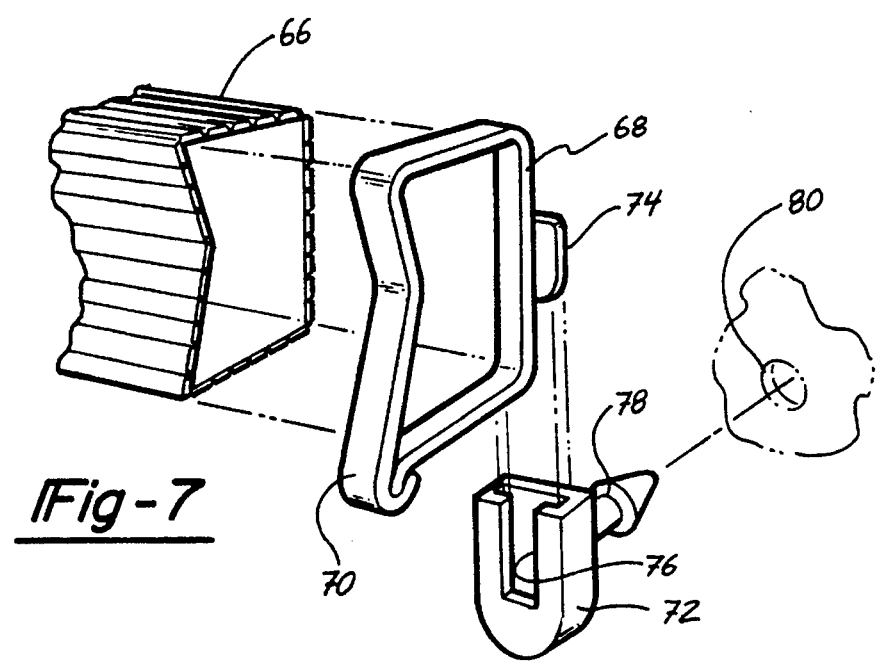
FIG. 7 is an exploded view illustrating the folded body and a fastener assembly.

FIG. 7 illustrates a perspective view of an exploded conduit assembly according to the present invention. A body 66 is shown in a reverse-K configuration, having both outward and inward folds as illustrated above with respect to FIG. 6. A two-pieced fastener 68 is shown having a strap member 70 and an attaching member 72. The fastener 68 is much the same as the fastener 60 shown in FIG. 6 and described with respect thereto, but according to this embodiment the strap member 70 is removably attachable to the attaching member 72 for positioning in the vehicle. Attachment is accomplished by an extension arm 74 fitted to the backside of the strap member 70. The arm 74 is designed to fit into a slot 76 defined in the attaching member 72. At one side of the attaching member 72 is provided a stud 78 that iS snap-fitted into an aperture 80 defined in the support member of the vehicle.

The multi-pieced construction of the fastener 68 of FIG. 7 allows for greater assembly and maintenance versatility because the body-strap assembly may be easily removed from the attaching member 72 without need to break the stud 78, as would otherwise be required.

Figure 8:
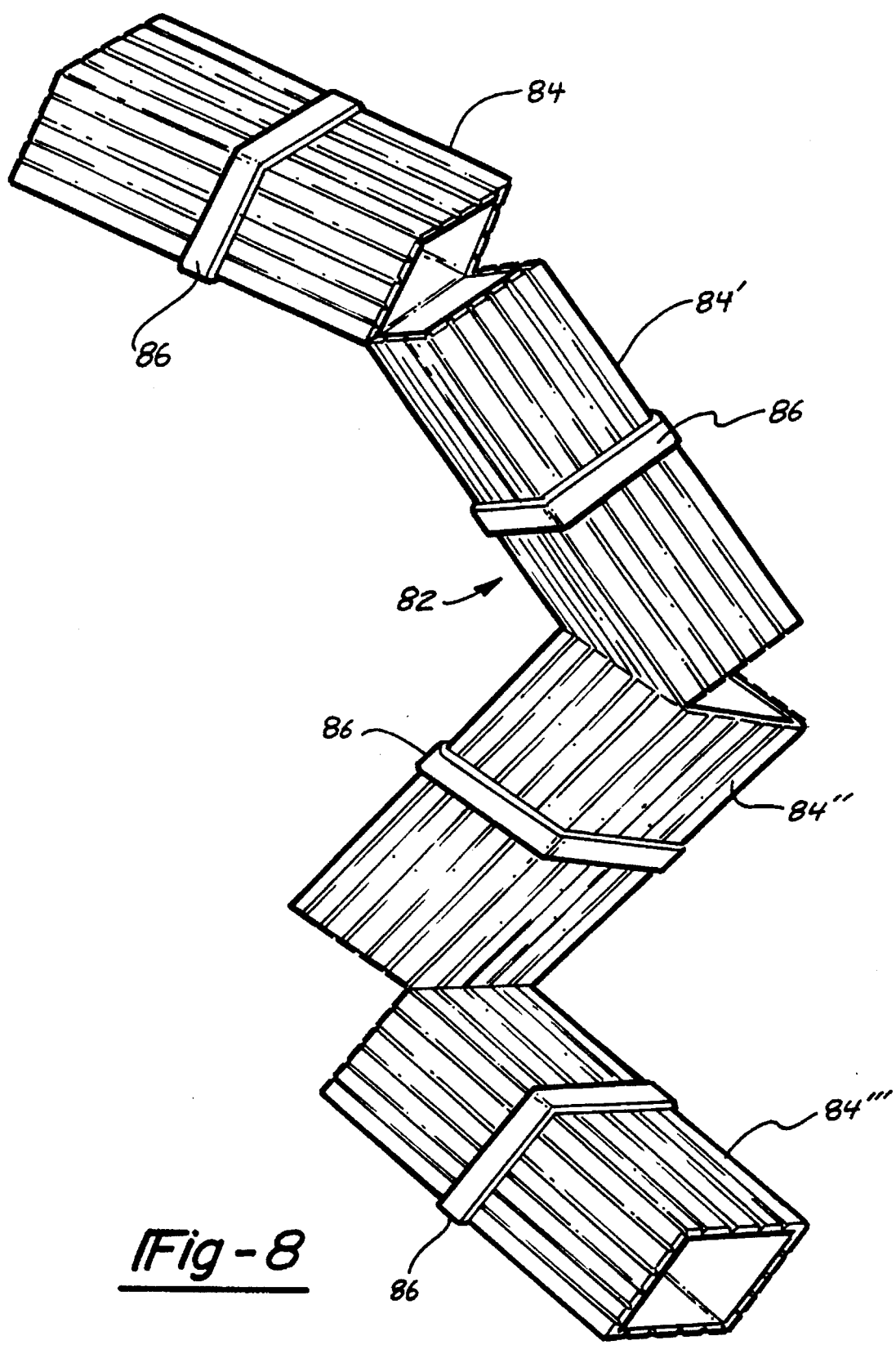
FIG. 8 is a perspective view illustrating a folded body that has been split and twisted for placement within the restricted space of a vehicle.

FIG. 8 illustrates a perspective view of a multi-sectioned conduit body, generally illustrated as 82. This figure demonstrates how a single extruded sheet, by selected cutting and folding, can be used to house, protect and support wiring (not shown) over an extended area. The body 82 is comprised of a plurality of subsections, in this case there are four subsections, each being sub-section 84, 84', 84", 84'''. Each individual subsection 84, 84', 84", 84''' is further supported by an optional wrap-around strap 86. Furthermore, each subsection 84, 84', 84", 84''' is joined along a discrete hinge that runs perpendicular to the axial perforations. In this manner the body 82 may be twisted and bent over a relatively long course without compromising any of its protective or supporting function.

Having described my invention, however, many modifications thereto will become apparent to those skilled in the art to which it pertains without deviation from the spirit of the invention as defined by the scope of the appended claims.

I claim:

1. A conduit binding system for holding conduits to a support member, said system comprising:

a plurality of interconnected strips, each of said strips being of a first thickness;

a plurality of bridges disposed between and interconnecting each of said strips, each of said bridges being of a second thickness, said second thickness of each of said bridges being less than said first thickness of each of said strips;

said plurality of said interconnected strips and said interconnecting bridges forming a conduit binding body; and means for fastening said body to a support member, said means for fastening said body to said support member comprising a strap portion and an attachment portion, said strap portion including a first strap half, a second strap half, and means for locking said first and second strap halves together.

2. The conduit binding system for holding conduits according to claim 1 wherein said bridges are defined by a perforation.

3. The conduit binding system for holding conduits according to claim 2 wherein said body has a first side and a second side, said perforation being defined on said first side of said body.

4. The conduit binding system for holding conduits according to claim 2 wherein said body has a first side and a second side, said perforations being defined on said first and second sides of said body.

5. The conduit binding system for holding conduits according to claim 1 wherein said body is extruded as a single sheet.

6. The conduit binding system for holding conduits according to claim 1 wherein said attachment portion includes a stud member for fitting into an aperture defined in said support member.

7. A conduit binder for binding conduits for application within a restricted space, said binder comprising:

a plurality of interconnected strips, each of said strips being of a first thickness;

a plurality of bridges disposed between and interconnecting each of said strips, each of said bridges being of a second thickness, said second thickness of each of said bridges being less than said first thickness of each of said strips;

said plurality of said flexibly interconnected strips being foldable along said interconnecting bridges;

means for attaching said binder to a support member, said means for attaching comprising a strap portion and an attachment portion, said strap portion including a first strap half, a second strap half, and means for locking said first and second strap halves together; and whereby said strips may be folded to form a binder of a preselected shape for fitting within a restricted space.

8. The conduit binder for binding conduits according to claim 7 wherein said attachment portion includes a stud member for fitting into an aperture defined in said support member.

9. A conduit binding system for holding conduits to a support member in respected spaces, said system comprising:

a body portion, said body portion including a plurality of interconnected strips, each of said strips being of a first thickness, each of said strips being separated by a perforation, said perforation defining a second thickness, said second thickness being less than said first thickness;

a wrap-around strap for wrapping around a portion of said body portion, said wrap-around strap having first half and a second half and further including means for locking said first and second strap halves together; and means for fastening said body portion to a support member.

10. The conduit binding system for holding conduits according to claim 9 wherein said body is an extruded piece of a plastic.

11. The conduit binding system for holding conduits according to claim 9 wherein said body includes a first side and a second side.

12. The conduit binding system for holding conduits according to claim 11 wherein said perforations are on said first side.

13. The conduit binding system for holding conduits according to claim 11 wherein said perforations are on said first and said second sides.

14. The conduit binding system for holding conduits according to claim 9 wherein said body is composed of a solid sheet of a plastic.

15. The conduit binding system for holding conduits according to claim 9 wherein said body is composed of a hollow sheet of a plastic.

* * * * *

UNITED STATES PATENT AND TRADEMARK OFFICE
CERTIFICATE OF CORRECTION

PATENT NO. : 5,564,672
DATED : October 15, 1996
INVENTOR(S) : Bradley A. Matson

It is certified that error appears in the above-indentified patent and that said Letters Patent is hereby corrected as shown below:

Column 1, line 17, after "patterns" insert --.--.

Column 1, line 67, after "sizes" insert --.--.

Column 2, line 1, after "strap" insert --design--.

Column 2, line 5, "Of" should be --of--.

Column 3, line 12, "Composed" should be --composed--.

Column 5, line 26, "iS" should be --is--.

Column 5, line 39, "sub-section" should be --subsection--.

Column 6, line 54, Claim 9, after "having" insert --a--.

Signed and Sealed this

Eighteenth Day of March, 1997

BRUCE LEHMAN

*Attest:*

*Attesting Officer*          Commissioner of Patents and Trademarks